United States Patent Office 2,849,419
Patented Aug. 26, 1958

2,849,419

ORIENTED FILAMENTS OF GRAFT COPOLYMER OF POLYACRYLATE POLYMERIZED ON VINYLIDENE CHLORIDE RESIN

Robert A. Hayes, Akron, and Francis A. Bozzacco, Massillon, Ohio, assignors to The Firestone Tire & Rubber Company, Akron, Ohio, a corporation of Ohio No Drawing. Application April 15, 1954
Serial No. 423,544

2 Claims. (Cl. 260—45.5)

This invention relates to oriented filaments composed essentially of graft copolymers produced by polymerizing polyacrylate of saturated monohydric alcohol on polymeric vinylidene chloride resin.

Polymeric vinylidene chloride resin (which term herein includes both vinylidene chloride polymers and copolymers of vinylidene chloride with up to 15 percent of vinyl chloride or other monomer) have been used extensively for extrusion into filaments which may be made into yarn, etc. These vinylidene chloride resins deteriorate on long exposure to light and heat, particularly heat. Copolymers of an acrylate with such vinylidene material containing more than 5 percent of acrylate show improved stability to heat, but these copolymers are unsatisfactory for extrusion into filaments. It has been found that graft copolymers of (1) polyacrylate of saturated monohydric alcohol on (2) polymeric vinylidene chloride resin have a similar heat-stabilizing effect. Moreover, they can be satisfactorily extruded into filaments. Furthermore, the polyacrylate in such a graft copolymer softens the copolymer and makes it more suitable for fabrication.

The graft copolymer is made by polymerizing polyacrylate on the vinylidene chloride resin. The graft copolymerization is carried out in emulsion.

The graft copolymer is composed of 10 to 50 parts of the polyacrylate and 90 to 50 parts of the polymeric vinylidene chloride resin. The preferred ratio is 20 to 30 parts of the polyacrylate to 80 to 70 parts of the vinylidene chloride-vinyl chloride resin. If an amount of the polyacrylate outside of the aforesaid range is employed, the graft copolymer is not particularly suited for extrusion and orientation. Less than 10 parts of the polyacrylate shows no substantial improvement, and if over 50 parts are employed the graft copolymer is so soft and flexible as to interfere with orientation.

Ordinarily in the production of the graft copolymer, one will employ copolymer of 85 parts of vinylidene chloride with 15 parts of vinyl chloride, or a mixture of these two monomers in this ratio. However, other comonomers than vinyl chloride may be used in substantially the aforesaid ratio, as is known in the art, and terpolymers, etc., may be employed. The monomers which may be copolymerized with vinylidene chloride include vinyl chloride, vinyl fluoride, vinyl acetate, styrene, acrylic and methacrylic esters such as methyl methacrylate, ethyl methacrylate and the like, acrylonitrile, vinyl-type ethers and ketones such as methylvinyl ether, methylvinyl ketone and related compounds such as methylisopropenyl ketone and the like. For a more complete list of compounds known to copolymerize with vinylidene choride to produce polymeric vinylidene chloride resin see Krczil "Kurzes Handbuch der Polymerisationstechnik," vol. II "Mehrstoffpolymerization," Edwards Bros., Inc., p. 739, the items indented under "vinylidene chloride."

Commercially it is most feasible to use ethyl acrylate as the aliphatic ester of acrylic acid in producing the graft copolymer. Methyl acrylate may be employed as well as the higher aliphatic esters including butyl acrylate, hexyl acrylate, octyl acrylate, etc., up to acrylates including ten carbon atoms in the aliphatic chain. The acrylates of higher molecular weight have a greater softening effect than the acrylates of lower molecular weight, and, in general, it will not be used in as large amount as the lower molecular weight acrylates; the ratios set forth above apply more particularly to the methyl and ethyl esters.

One detailed example for the preparation of the graft copolymer is given below, but it is to be understood that the example is illustrative and that the invention is not limited to the use of graft copolymers prepared as there described. The resulting graft copolymers are used for extrusion in ways well known in the art. Filaments of small cross-sectional area suitable for the production of yarn can be obtained, as well as filaments of larger cross section such as used as monofils.

EXAMPLE

This illustrates the preparation of a graft copolymer by polymerizing an acrylate onto polymeric vinylidene chloride resin.

The following ingredients were used in the preparation of polymeric vinylidene chloride resin:

|   | Parts |
|---|---|
| Vinylidene chloride | 85 |
| Vinyl chloride | 15 |
| Water | 300 |
| Potassium persulfate | .30 |
| Glycidyl phenyl ether | 1.0 |
| MP–189–S | 4 |
| Dodecyl mercaptan | .5 |

MP–189–S is sodium alkyl sulfonate in which the alkyl group contains sixteen to twenty carbon atoms. The polymerization was carried out at 50° C. until approximately 100 percent conversion was reached. The above latex was charged with the following ingredients:

|   | Parts |
|---|---|
| Ethyl acrylate | 43 |
| Potassium persulfate | .3 |

This graft copolymerization was carried out at reflux temperature and was carried substantially to completion. The polymer was isolated from the latex by coagulation with aqueous calcium chloride solution, and thoroughly washed and dried. The properties of a filament obtained from this graft copolymer are shown in the table.

In the table the properties of oriented filaments spun from the graft copolymers of the foregoing examples is compared with the properties of a commercial vinylidene-vinyl chloride oriented filament.

Table

|  | Hot air shrinkage, percent | 1 hour boiling water shrinkage, percent | Tensile |
|---|---|---|---|
| Example I | 11 | 7 | 38,600 |
| Commercial | 20 | 14 | 47,000 |

The reduced heat-shrinkage of the oriented filaments spun from the graft copolymers of this invention is clearly illustrated in the table.

The invention is defined by the claims which follow.

What we claim is:

1. An oriented filament composed of graft copolymer, which graft copolymer is composed of 50 to 90 parts of polymeric vinylidene chloride resin of at least 85 parts of vinylidene chloride and up to 15 parts of monoethylenically unsaturated monomer copolymerized therewith, and 50 to 10 parts of a polyacrylate polymerized on to the graft copolymer, said polyacrylate being a polyester of a saturated monohydric alkyl alcohol containing 1 to 10 carbon atoms in the alkyl group.

2. An oriented filament composed of graft copolymer, which graft copolymer is composed of 70 to 80 parts of copolymer of substantially 85 parts of vinylidene chloride and 15 parts of vinyl chloride, and 30 to 20 parts of polyethyl acrylate polymerized onto the graft copolymer.

References Cited in the file of this patent

UNITED STATES PATENTS

| | | |
|---|---|---|
| 2,520,959 | Powers | Sept. 5, 1950 |
| 2,614,089 | Harrison et al. | Oct. 14, 1952 |
| 2,746,944 | Naps et al. | May 22, 1956 |

FOREIGN PATENTS

| | | |
|---|---|---|
| 607,755 | Great Britain | Sept. 3, 1948 |
| 627,265 | Great Britain | Aug. 4, 1949 |
| 679,562 | Great Britain | Sept. 17, 1952 |